United States Patent
Ewert

(10) Patent No.: US 9,072,274 B2
(45) Date of Patent: Jul. 7, 2015

(54) DEVICES AND METHODS FOR PREPARING ANIMALS FOR MILKING

(71) Applicant: Terry S. Ewert, Abbotsford, WI (US)

(72) Inventor: Terry S. Ewert, Abbotsford, WI (US)

(*) Notice: Subject to any disclaimer, the term of this patent is extended or adjusted under 35 U.S.C. 154(b) by 166 days.

(21) Appl. No.: 14/013,994

(22) Filed: Aug. 29, 2013

(65) Prior Publication Data

US 2015/0059657 A1 Mar. 5, 2015

(51) Int. Cl.
*A01J 7/04* (2006.01)

(52) U.S. Cl.
CPC ............................. *A01J 7/04* (2013.01)

(58) Field of Classification Search
CPC ..................... A01J 7/04; A01J 7/022
USPC ................. 119/651, 670, 652, 14.47
See application file for complete search history.

(56) References Cited

U.S. PATENT DOCUMENTS

| | | | |
|---|---|---|---|
| 5,211,132 A | 5/1993 | Farina et al. | |
| 5,235,937 A | 8/1993 | Farina et al. | |
| 5,383,423 A | 1/1995 | van der Lely | |
| 6,155,204 A | 12/2000 | van der Lely et al. | |
| 6,321,688 B1 | 11/2001 | Eriksson | |
| 6,325,021 B1 | 12/2001 | Farina | |
| 6,591,784 B1 | 7/2003 | Eriksson | |
| 2012/0097107 A1 | 4/2012 | Torgerson et al. | |
| 2012/0240865 A1 | 9/2012 | Dole | |

FOREIGN PATENT DOCUMENTS

| | | |
|---|---|---|
| RU | 2299559 C2 | 5/2007 |
| SU | 1500217 A1 | 8/1989 |
| SU | 1667751 A1 | 8/1991 |

OTHER PUBLICATIONS

Search Report for PCT/US/2014/018216, mailed Jun. 10, 2014.
Written Opinion for PCT/US/2014/018216, mailed Jun. 10, 2014.

*Primary Examiner* — Yvonne Abbott-Lewis
(74) *Attorney, Agent, or Firm* — Westman, Champlin & Koehler, P.A.; Z. Peter Sawicki; Visala Goswitz

(57) ABSTRACT

Systems for cleaning, sanitizing and stimulating the udder or teats of milk-producing animals include a hand-held washer. The hand-held washer has an ergonomical handle and a trigger that engages a valve and releases sanitizing wash and compressed air when actuated. An airmotor within the washer engages spindles and powers conveyance of teat belts mounted on the spindles. Teat belts with flaps clean and stimulate the teat present in the top opening of the washer. Air is also injected for drying. The teat belts are effective in removing sand from the animal when animals are raised in a sandy bedding environment and are advantageously durable. Methods of using the washer for preparing the animals are also disclosed.

24 Claims, 18 Drawing Sheets

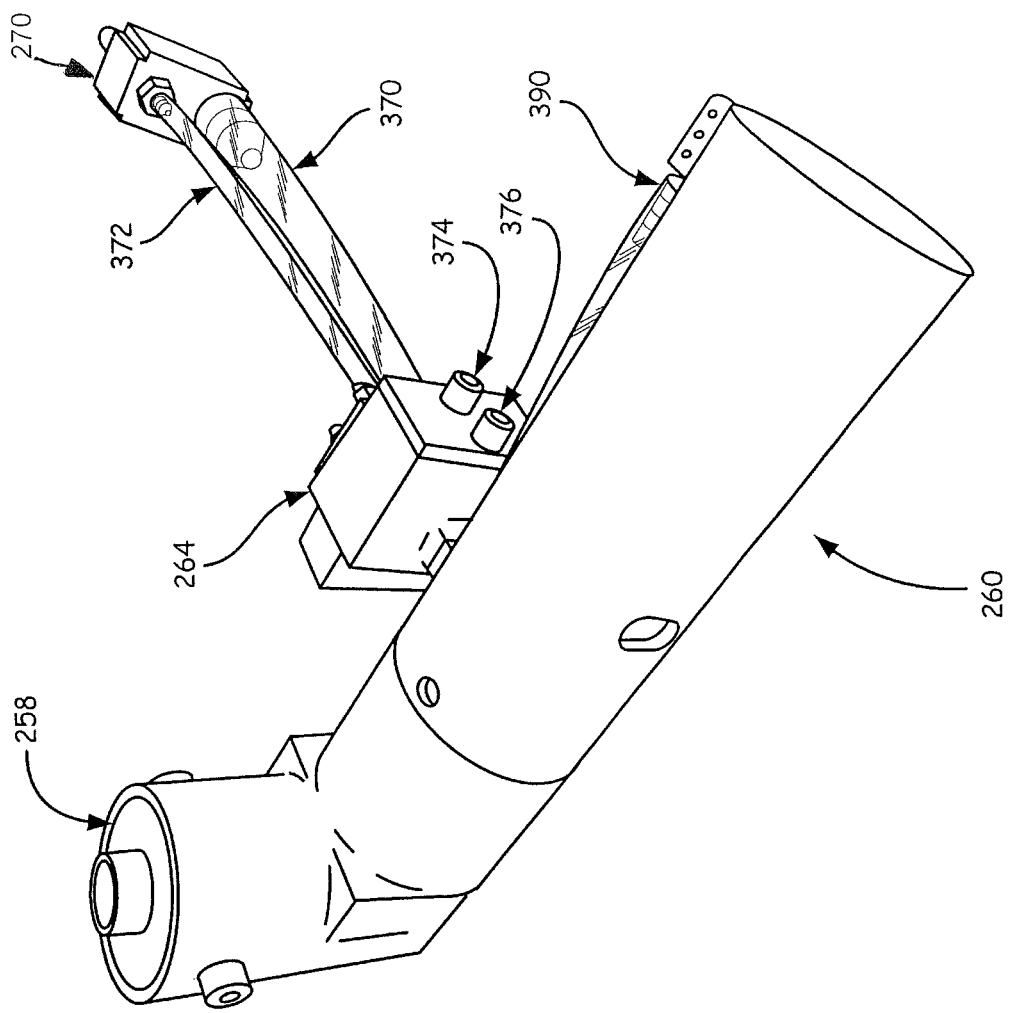

DEVICES AND METHODS FOR PREPARING ANIMALS FOR MILKING

FIELD

This disclosure relates to milk-producing animals and more specifically relates to devices used for preparation of dairy animals for milking.

BACKGROUND

Cleaning udders of milk-producing animals is a necessary step to avoid contaminated milk as well as to avoid issues such as mastitis by the animal. A variety of devices and methods have been used to clean the udder and teats of milk-producing animals in preparation for milking. Some methods have included manual dipping of teats in a disinfectant solution prior to milking. The disinfectant solution must then be wiped off or removed from the animal prior to milking. This is a laborious process that is not practical for a large-scale dairy farm.

A variety of systems have also been designed that include brushes for cleaning in combination with a sanitizing solution. Examples of these systems are described in, for example, U.S. Pat. No. 5,211,132, and U.S. Patent Application No. 2012/0240865. The udders and teats can have sand residue due to the practice of using sandy bedding in dairy farms. The presence of sand residue on udders can challenge udder-cleaning systems. A cleaning system utilizing brushes generally needs to have frequent replacement of the brushes. Replacement of brushes in a large-scale dairy farm can amount to a substantial cost in the operation of the farm. Systems have also been described that use high-pressure water. With these systems, however, the use of electricity to power the systems can be inconvenient and dangerous. In addition, significant amount of water was left on the udder that can lead to contamination of the milk during milking.

SUMMARY

In a first aspect, the present invention includes a system for cleaning udders of milk-producing animals comprising a handheld washer. The washer includes an airmotor with a planetary gear reduction and a right angle output drive configuration, a frame comprising a mounting plate configured for an outer pair of knurled spindles holding a first teat belt and an inner pair of knurled spindles holding a second teat belt, drive belts attached to the planetary gear reduction system to drive all the spindles, wherein the teat belts and the drive belts are on opposite sides of the mounting plate. The washer also includes a movable block slidable on a stationary pin to translate or rotate the outer pair of spindles away from the inner spindles, an opening at the top end for receiving a teat or teats for sanitizing/stimulation; a handle with a trigger engaged with the actuator pin end of a valve block for releasing liquid and air onto the teat when the trigger is actuated and housing configured to house the washer components in a functional manner.

In another aspect, the present invention includes a method for preparing udders of milk-producing animals for milking comprising inserting a teat into an opening in the top-end of a handheld washer and actuating a trigger on the washer wherein actuation of the trigger releases liquid and air and drives teat belts in the washer to clean and stimulate the teat. The hand held washer used in the method includes an airmotor with a planetary gear reduction and a right angle output drive configuration, a frame comprising a mounting plate configured for an outer pair of knurled spindles holding a first teat belt and an inner pair of knurled spindles holding a second teat belt, drive belts attached to the planetary gear reduction system to drive all the spindles, wherein the teat belts and the drive belts are on opposite sides of the mounting plate. The washer also includes a movable block slidable on a stationary pin to translate or rotate the outer pair of spindles away from the inner spindles, an opening at the top end for receiving a teat or teats for sanitizing/stimulation, a handle with a trigger engaged with the actuator pin end of a valve block for releasing liquid and air onto the teat when the trigger is actuated and housing configured to house the washer components in a functional manner.

BRIEF DESCRIPTION OF THE DRAWINGS

FIG. 8B is a perspective view of an airmotor and a valve used in an udder gun.

DETAILED DESCRIPTION OF ILLUSTRATIVE EMBODIMENTS

Systems and methods of preparing milk-producing animals for milking are disclosed herein. Udders of milk-producing animals are generally sanitized and stimulated in preparation for milking. The system described herein includes a hand-held washer device or udder gun that washes, sanitizes, stimulates and dries a teat before milking. The hand-held device utilizes liquid along with air to drive two teat belts that can clean and prepare the udder of the animal for milking. The system also includes components for providing the udder gun with water at a desired temperature, air and optionally, sanitizing chemicals at the desired concentration.

The hand-held device described herein may be referred to herein as an udder gun or as a teat washer. The two terms may be used interchangeably.

The udder gun includes an air motor with a planetary gear reduction that powers twin drive belts, teat belts with flaps mounted on knurled spindles and a trigger engaged with a valve block connected to a liquid line and an air line. Actuation of the trigger engages the valves resulting in dispensation of liquid and air in addition to driving the teat belts to clean, sanitize and stimulate the udder. The udder gun is provided with liquid and air by lines connected to a system capable of providing compressed air, water and optionally, sanitizing chemicals.

The udder gun includes housing configured to include the components described herein and also includes hinged covers on the drive belt side and teat belt side to provide easy access for cleaning and maintenance. The housing further includes an opening on the top end to receive the udder. Advantageously, the udder gun is less abrasive and longer lasting than a bristle brush system, especially when the animals have been exposed to sand bedding. In addition, the systems described herein are air and water driven. The lack of electricity needed to run the systems eliminates any stray voltage exposure to the animal.

Figure 1A:
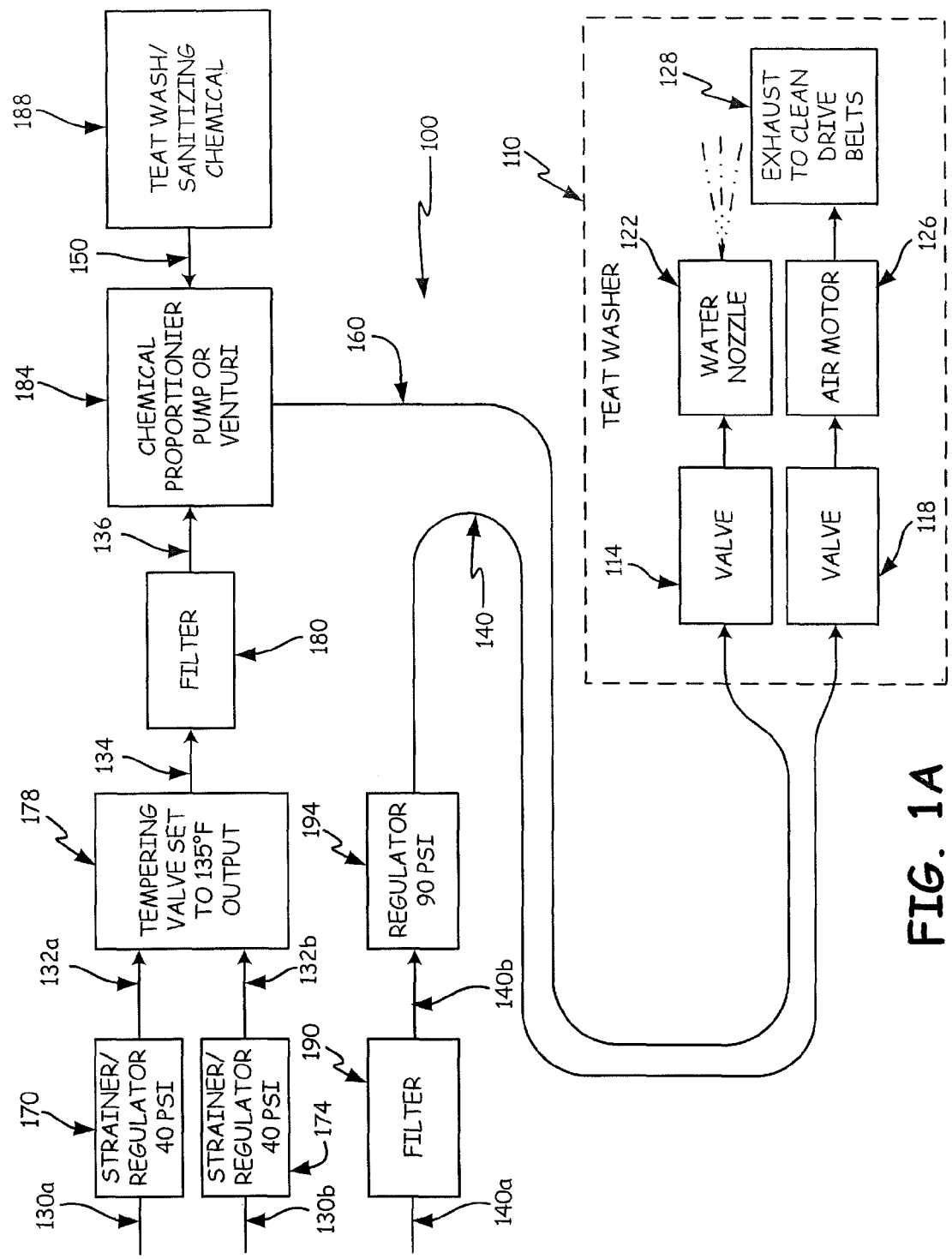
FIG. 1A is a schematic diagram of a system for preparing milk-producing animals for milking.

FIG. 1A is a schematic diagram of one exemplary embodiment of a system for preparing milk-producing animals for milking. System 100 includes line 140 that provides compressed air and line 160 that provides liquid to teat washer 110. Liquid as used herein can be water, a mixture of water with a sanitizing chemical such as lactic acid. Other sanitizing chemicals are also within the scope of the invention. The temperature of the water or liquid may be adjusted to a desired temperature. A mixture of water and sanitizing chemical may be referred to herein as treated water. If used, the concentration of the sanitizing chemical in the liquid can vary. The concentration of the sanitizing chemical can be adjusted as desired.

Teat washer 110 includes valve 114 to control flow of liquid to nozzle 122. Teat washer 110 also includes valve 118 to control air flow to air motor 126 and configured such that exhaust from air motor is vented to clean drive belts. Teat washer device is described in greater detail herein and illustrated in FIGS. 2-13.

In the system of FIG. 1A, line 140a is connected to a compressed air source. A variety of compressed air sources are known and may be used in the system described. Line 140a provides compressed air to filter 190. Filtered air exits filter 190 into line 140b and enters regulator 194. Compressed air exits regulator 194 and is transported in line 140 to valve 118 of teat washer 110. The Filter/Regulator used can be, for example, a Wilkerson model B08-02-FKG0 purchased from Wilkerson Corp. Richland, Mich. In one exemplary embodiment, compressed air when it first enters line 140a is at 60 PSI/MIN and 8.9 CFM. In one preferred embodiment, regulator 194 is set to release compressed air at 90 PSI.

System 100 includes line 130a that provides hot water to strainer/regulator 170. The hot water is transported through strainer/regulator 170 and exits into line 132a at a desired pressure, for example at 40 PSI. Line 132a then provides the hot water to tempering valve 178. Line 130b provides cold water to strainer/regulator 174. The cold water is transported through strainer/regulator 174 and exits into line 132b at a desired pressure, for example at 40 PSI. Line 132b then provides the cold water to tempering valve 178. Hot water and cold water are combined in tempering valve 178 to generate water at a selected temperature. Tempering valve 178 can be adjusted to provide water at various selected temperatures. The amount of hot and cold water allowed to flow through tempering valve 178 is dependent on the temperature selected and the starting temperatures of the hot and cold water before entering valve 178. In an exemplary embodiment, the hot water entering line 130a is between about 135° F. and about 180° F. and the water exiting tempering valve 178 is about 135° F. Hot water may be at a temperature outside this range. As an alternative to using a tempering valve, a dedicated hot water heater may be used upstream of the system to supply constant temperature hot water.

Water at the selected temperature, for example 135° F., exits tempering valve 178 into line 134 that allows the water to flow through filter 180. Line 136 then transports the water from filter 180 to chemical proportioner 184. Chemicals such as sanitizing chemicals or washers in dispenser 188 are also provided to chemical proportioner 184. Water and the chemicals are combined in chemical proportioner 184 to a selected concentration. Treated water, i.e. water and sanitizer or other liquids, are provided to valve 114 of teat washer 110 by line 160. Line 160 carrying liquid may be an insulated hose line.

Advantageously, tempering valve 178 can be a commercially available thermostatic mixing valve to accurately regulate water temperature. The valve can be, for example, Watts model 1170-UT-2½" valve purchased from Watts in North Andover, Mass. The water exiting valve 178 may flow at variety of flow rates. In an exemplary embodiment, water exiting valve 178 flows at about 8 ounces/minute (0.06 gallons/min). Other flow rates are also within the scope of this invention.

Figure 1B:
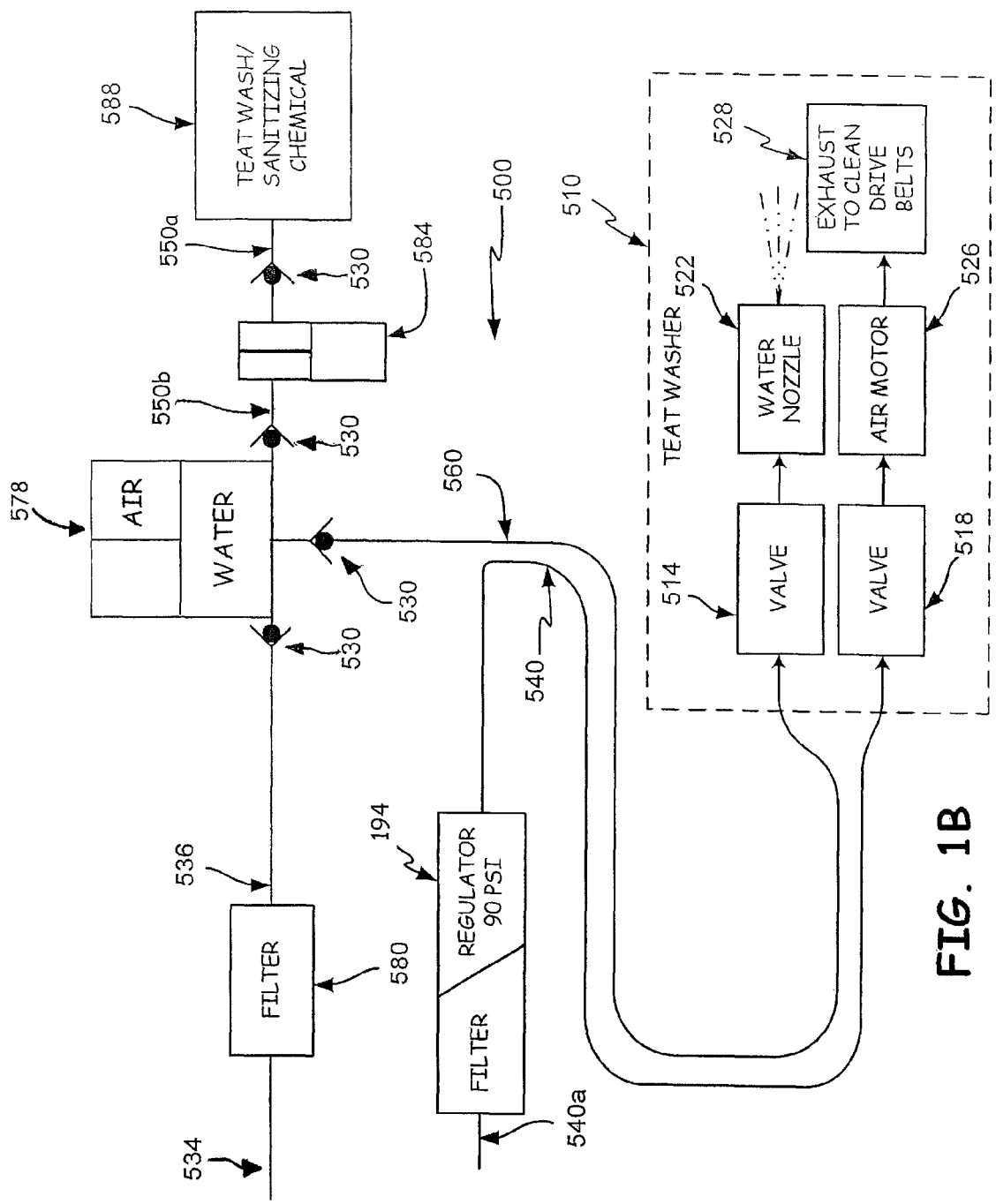
FIG. 1B is a schematic diagram of a system for preparing milk-producing animals for milking.

FIG. 1B is a schematic diagram of another exemplary system for preparing milk-producing animals for milking. As an alternative to using tempering valve 178 in system 100, system 500 includes line 534 that is connected to a dedicated hot water heater upstream of the system to supply constant temperature hot water. Water at the selected temperature, for example 135° F., exits line 534 and flows through filter 580. Line 536 then transports the water from filter 580 to water accumulation/pumping cylinder 578. Chemicals such as sanitizing chemicals or washers in dispenser 588 are provided to chemical injection cylinder 584 by line 550a. Chemicals from chemical injection cylinder 584 exit from line 550b and combine with water from cylinder 578 at a selected ratio. Treated water, i.e. water and sanitizer or other liquids, are provided to valve 514 of teat washer 510 by line 560. Line 560 carrying liquid may be an insulated hose line. Check valves 530 may be present at multiple locations to control the system as illustrated in FIG. 1B. Check valves may also be present in other locations and are also within the scope of this invention. Other modifications that similarly supply the teat washer/udder gun with the appropriate air and water are also within the scope of the invention.

Figure 1C:
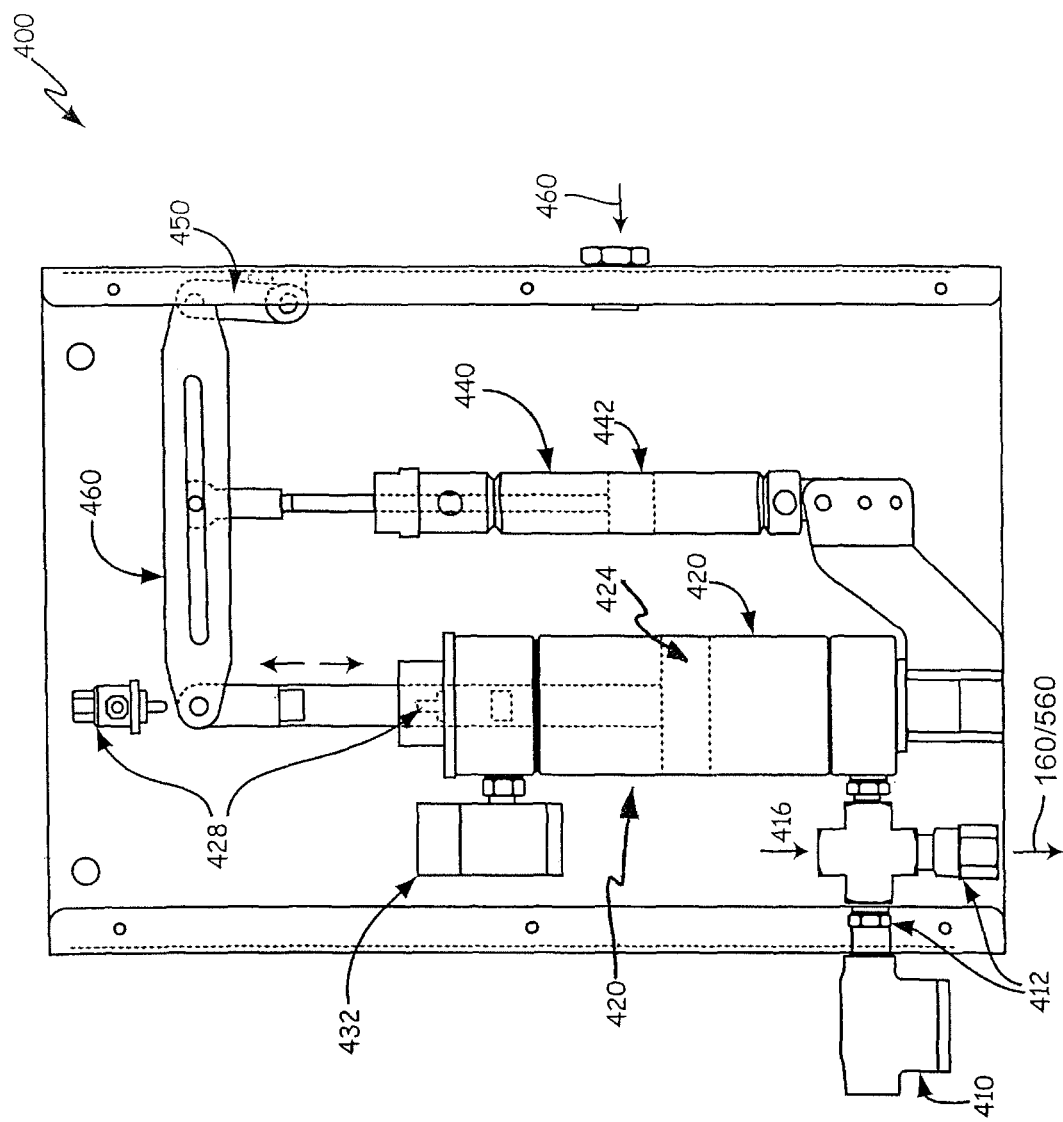
FIG. 1C is a schematic view of a water/chemical unit.

FIG. 1C is a schematic view of an exemplary water accumulation/pumping cylinder and chemical injection cylinder that can be used in the systems described in FIG. 1A and FIG. 1B. As shown in FIG. 1C, water/chemical unit 400 includes accumulation cylinder 420 with piston 424, end travel pilot valves 428, and 3-way pilot operated air valve 432. As water accumulates in accumulation cylinder 420, piston 424 moves up and increase in air pressure moves piston 424 down. Water/chemical unit 400 also includes chemical injection cylinder 440 with piston 442. Ratio lever 460 is operably connected to piston 424 and piston 442. The amount of chemical entering accumulation cylinder 420 from chemical injection cylinder 440 is dependent on the ratio selected. Ratio lever 460 is also connected by pivot link 450 to air inlet 460. Water from strainer 410 and chemical/sanitizer enter chemical proportioner 416 that is valved for entry and exit of the water/sanitizer mix.

Use of accumulation cylinder 420 enables water to flow in intermittently above 0.5 gallons/min and then run out slowly between about 0.04 gallons/minute and about 0.1 gallons/min By pressurizing the air side of accumulation cylinder 420, a higher and more stable water pressure can be achieved in line 160/560 regardless of low and variable water pressures coming into the system. This enables line 160/560 to be a smaller diameter water line and enables minimal heat loss. In one exemplary embodiment, line 160/560 has an inside diameter of about 1/16" to about 1/8". Lines with diameter outside of this range are also within the scope of the invention.

In preferred embodiments, the volume of water in accumulating cylinder 420 is kept relatively small to minimize the heat loss and for a quicker recovery. The movement of pump in accumulation cylinder 420 drives chemical injection cylinder 440. Water driven chemical dosing pumps are unable to be run at the high 130° F. water temperature. The ratio of chemical dosing can be adjusted by moving the rod end of chemical cylinder to a different location on the ratio lever.

Figure 2:
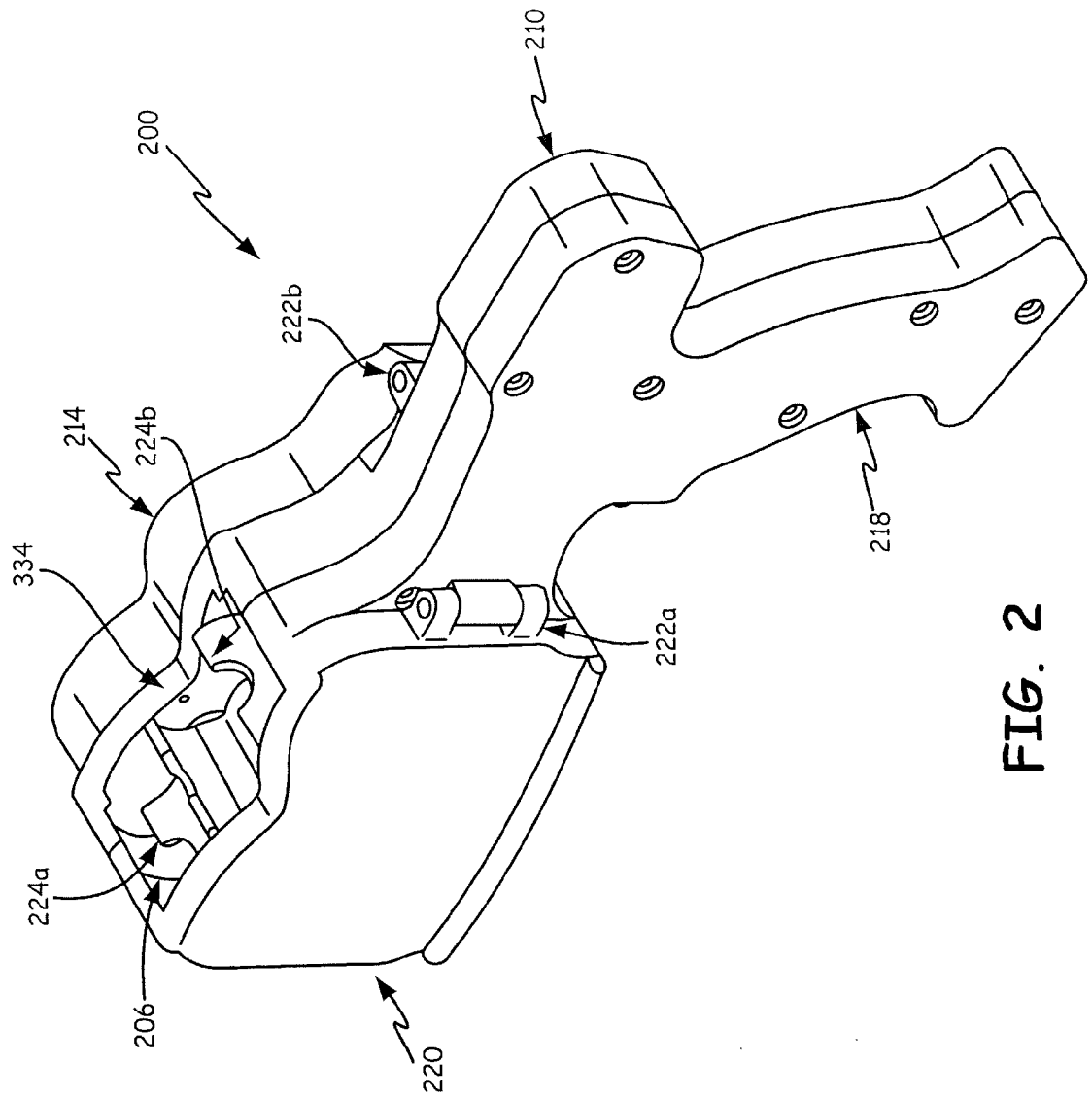
FIG. 2 is a perspective view of an exemplary udder gun.

FIG. 2 is a perspective view of exemplary teat washer 200. Washer 200 is preferably a hand-held device and includes ergonomically shaped handle 218. Housing 210 provides a framework for enclosing the assembled components described in greater detail herein and illustrated, for example, in FIG. 3 and FIG. 5A. Cover 214 encloses a pulley assembly with twin drive belts and cover 220 encloses teat belts 224a and 224b. Covers 214 and 220 are hinged and attached through hinges 222b and 222a, respectively so that they can be opened for cleaning and maintenance FIG. 2 also illustrates opening 206 at the top end of washer 200 through which teat belts 224a and 224b are visible. Opening 206 is sufficiently sized to receive a teat or teats of an animal that is to be cleaned and stimulated prior to milking. Generally, one teat at a time is accomodated by opening 206. Alternatively, more than one teat may be accomodated, especially if the teats are close together. Opening 206 is defined by top ends of cover 220 and mounting plate 334 of frame 212.

Figure 3:
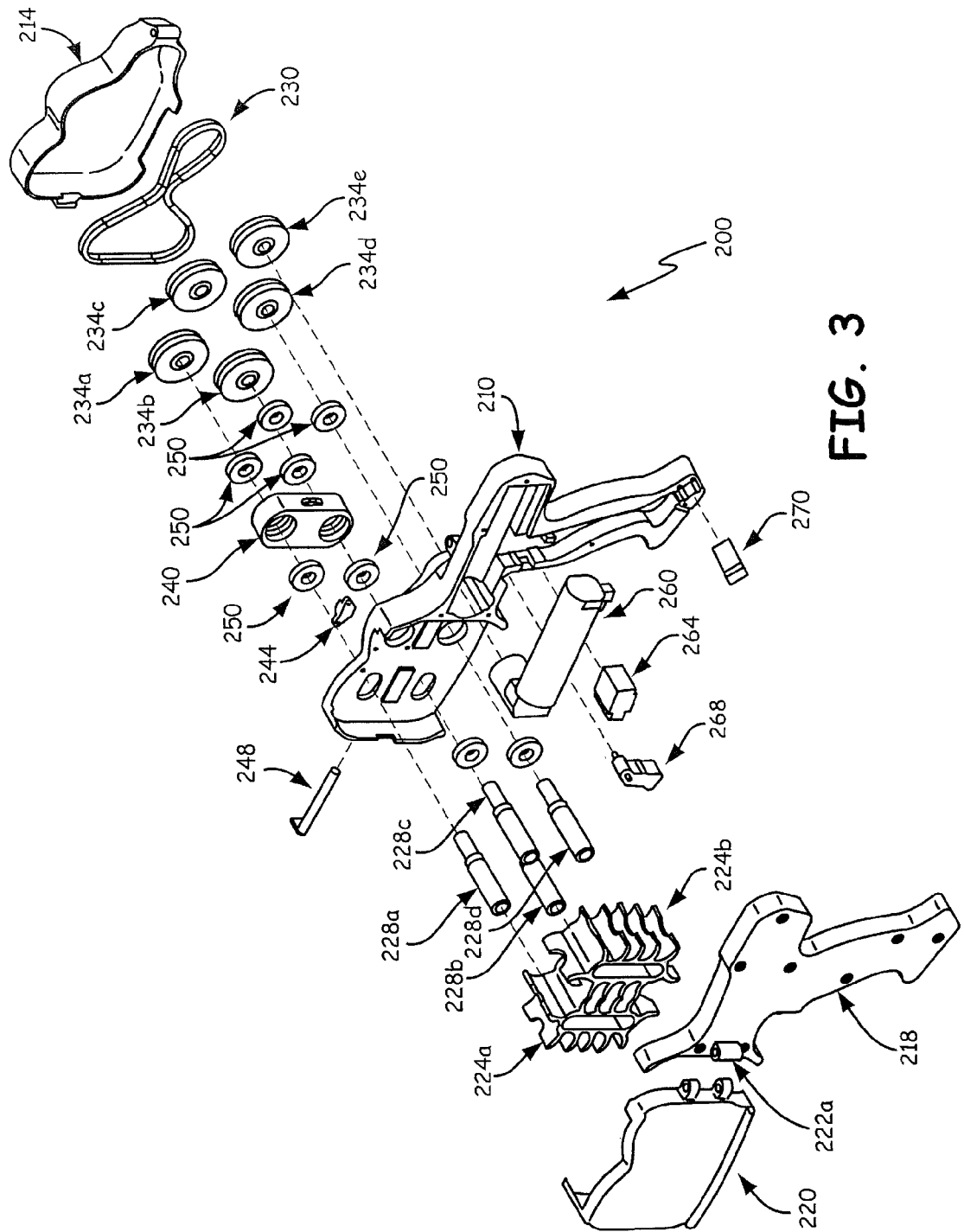
FIG. 3 is an exploded perspective view of a udder gun.

FIG. 3 is an exploded perspective view of washer 200 and is shown with most of the components. Frame 212 forms the framework of washer 200 and components are attached on either side of frame 212 as described in greater detail herein and illustrated FIGS. 4-12. Housing 210 includes frame 212 with mounting plate 334. Housing 210 also includes handle and shaft cover 218, cover 214 and cover 220.

Figure 4:
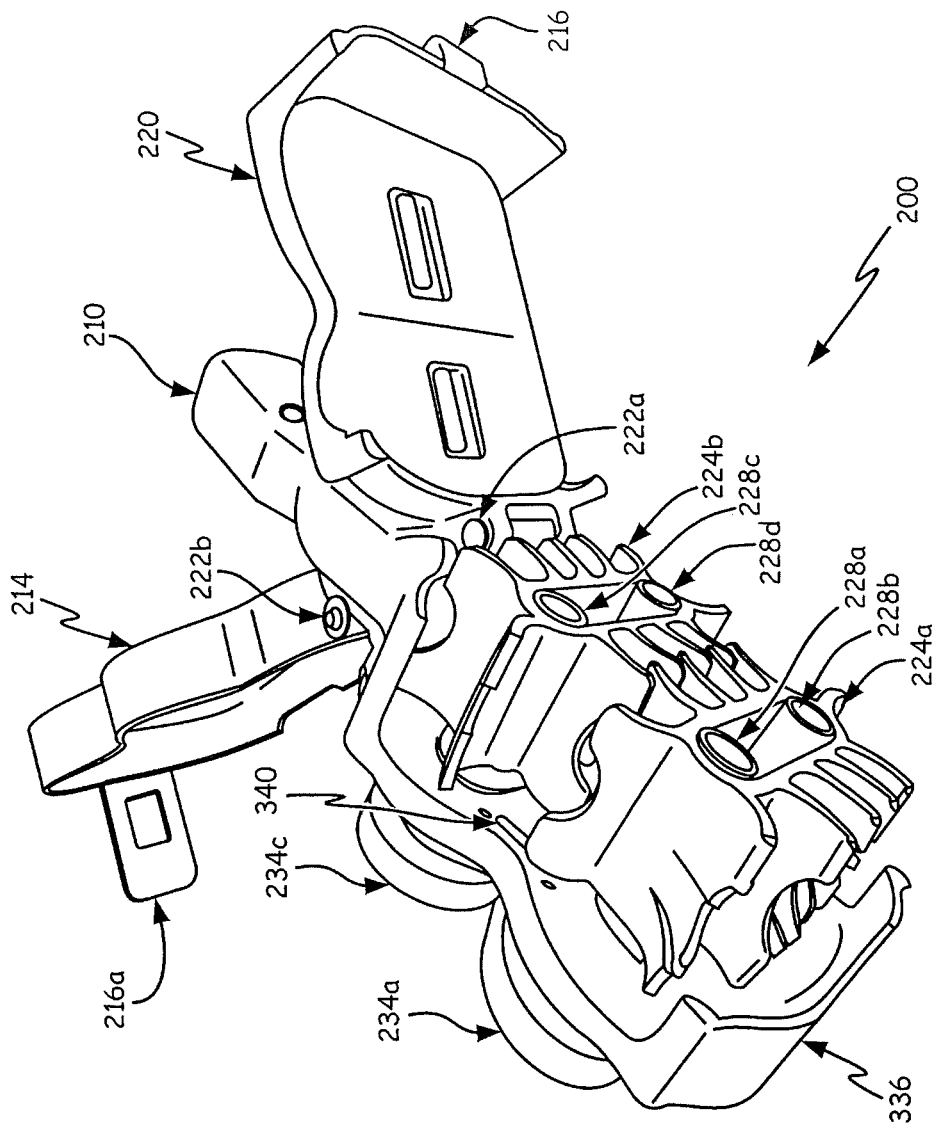
FIG. 4 is a perspective view of an udder gun in an open configuration.

FIG. 4 is a perspective view of teat washer 200 in an open configuration. Teat belt cover 220 and drive belt cover 214 are in an open configuration and attached to housing 210 by hinged joints 222a and 222b. The hinged attachment of covers 220 and 214 allows for easy access for cleaning and maintenance of washer 200. Covers 220 and 214 also include complementary latches 216a and 216b that are configured in a suitable manner to fasten covers 220 and 214 to each other and hold in a closed configuration during operation of washer 200.

FIG. 4 also illustrates teat belt 224a mounted on knurled spindles 228a-b and teat belt 224b mounted on knurled spindles 228c-d. During operation, teat belts 224a-b rotate around the respective knurled spindles in a fashion similar to a conveyor belt. The size of the knurled spindles can vary. In some preferred embodiments, knurled spindles are about ½ inch in diameter. Spindles of other diameters are also within the scope of this invention. The speed of the spindles can vary and is dependent on the specific use. In some embodiments, the spindles can move between about 900 to about 1200 RPM. Spindles moving at higher and lower RPMs are also within the scope of the invention. In preferred embodiments, during operation the speed of the teat belt is slower when it is on the teat and then at the bottom the belt accelerates around the spindle creating enough centrifugal force to clean the flap belt of debris and excess water, before coming back around to contact the teat again.

Figure 14:
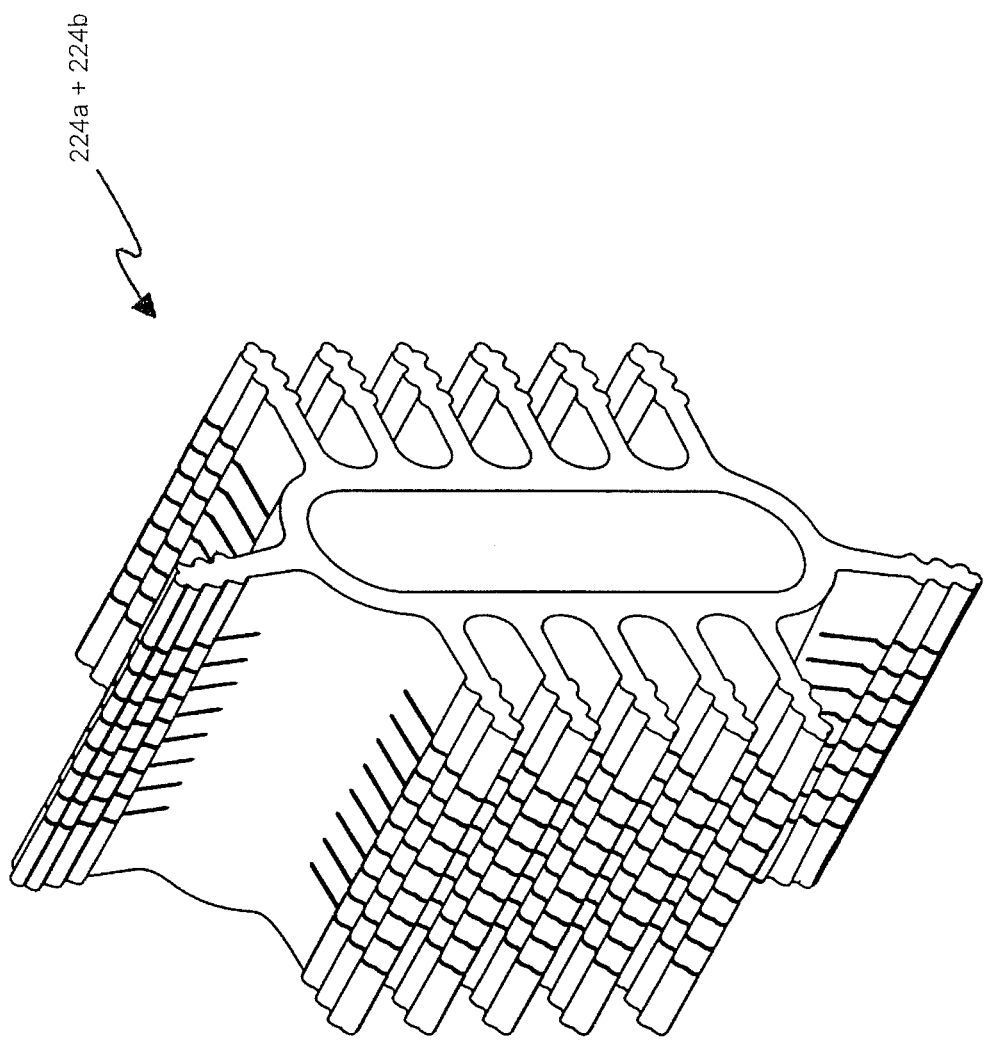
FIG. 14 is a perspective view of an exemplary teat belt.

Teat belts 224a and 224b include multiple flaps that during operation clean and stimulate an animal teat. Teat belts 224a and 224b allow for more contact area with an elongated teat than rotary brushes of prior art washers. Teat belts can be made from a variety of materials that are malleable and durable. In an exemplary embodiment, teat belts are made from elastomer. FIG. 14 is a schematic view of one exemplary teat belt. The number of flaps in each of the teat belts and the shape of these flaps can vary. Teat belts with eleven flaps and thirteen flaps are exemplified but teat belts with greater or fewer flaps are also within the scope of this invention.

In some embodiments, teat belts 224a and 224b may include grooves and slits within the flaps as illustrated in FIG. 14. The slits in the flaps can allow each flap to conform better to the shape of the teat. The slits are placed to generate narrow, individual sections near the center of the flap, leaving wider sections on the outer portions of the flap. The wider outer portions of the flaps are thereby stiffer and tend to center the teat when a teat is present and help to clean the sides of the teat by overlapping with the opposed teat belt. The slits may also be staggered, relative to an adjacent flap on the teat belt, creating overlap on the teat to clean more thoroughly. When the teat enters two opposed teat belts (224a and 224b), the narrow sections tend to bend over, conforming to the shape of the teat. The raised ribs positioned along the tip of the flap provide better cleaning and stimulating action on the teat.

Figure 5:
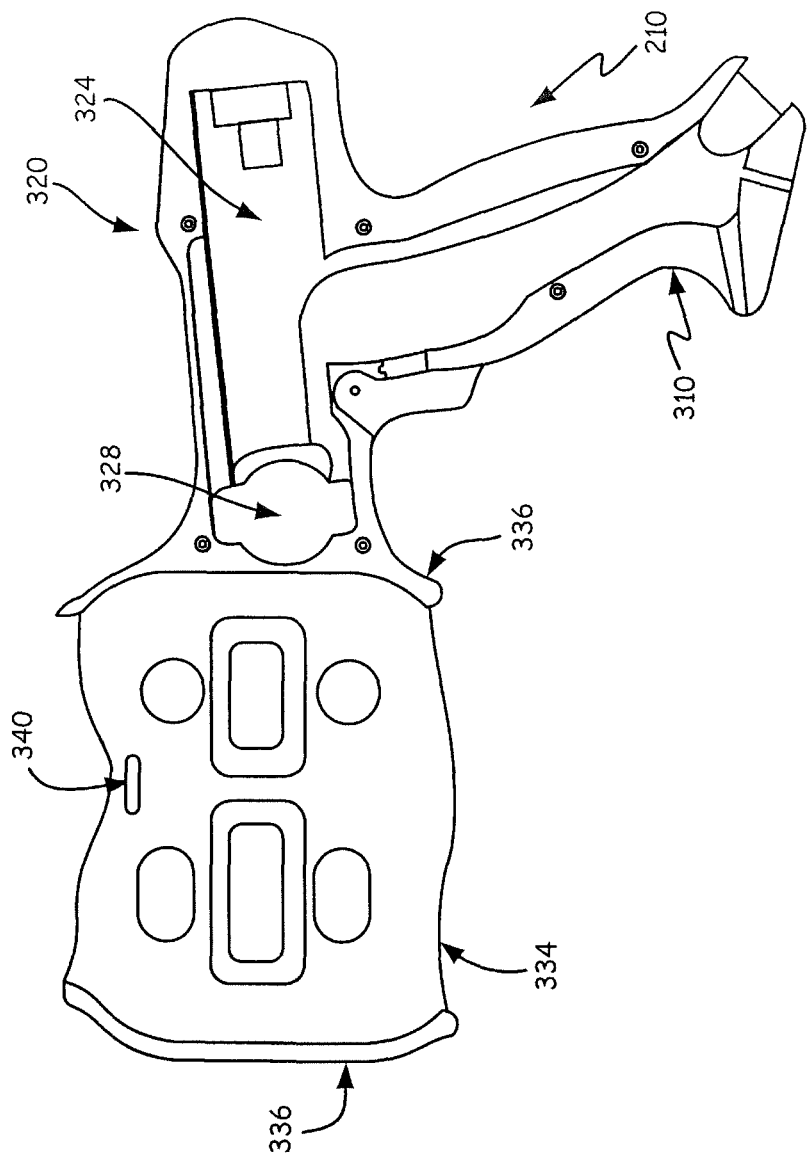
FIG. 5 is a schematic diagram of the teat belt side of the frame of an udder gun.

FIG. 5 is a schematic diagram of the teat belt side of frame 210 of teat washer 200. Frame 210 and other housing components described herein may be made from a variety of materials including metal such as stainless steel, plastic such as polypropylene and the like. Preferably, housing components are made from materials that are light-weight in order to enable the user to operate washer 200 for long periods of time without having to rest. Frame 210 includes handle 310, shaft 320 and mounting plate 334. Handle 310 is shaped ergonomically with a pistol grip. Other types of ergonomically shaped handles with other types of grips may be used and are all within the scope of the invention. Handle 310 is configured to hold a valve assembly and connections to water and air sources as discussed below. Shaft 320 is configured to receive an air motor within groove 324 and extending through opening 328 to drive belt side of frame 210. In this exemplary embodiment, the air motor is barrel shaped but the air motor may have a variety of shapes. Knurled spindles 228a-d are mounted on the teat belt side of mounting plate 334 with pulleys 234a-d on the drive belt side of mounting plate 334. Mounting plate 334 may have lip 336 on the front side and the shaft side configured to accommodate cover 220 and handle and shaft cover 218. Mounting plate 334 also includes water slit 340 that allows water from an aperture in nozzle 244, mounted on the drive belt side to project water through slit 340 and into the teat belt side and onto the teat when engaged to an animal. The details of the water flow are described in greater detail below. The top of mounting plate 334 is curved to accommodate a teat and defines one side of opening 206 for teat engagement.

Figure 6:
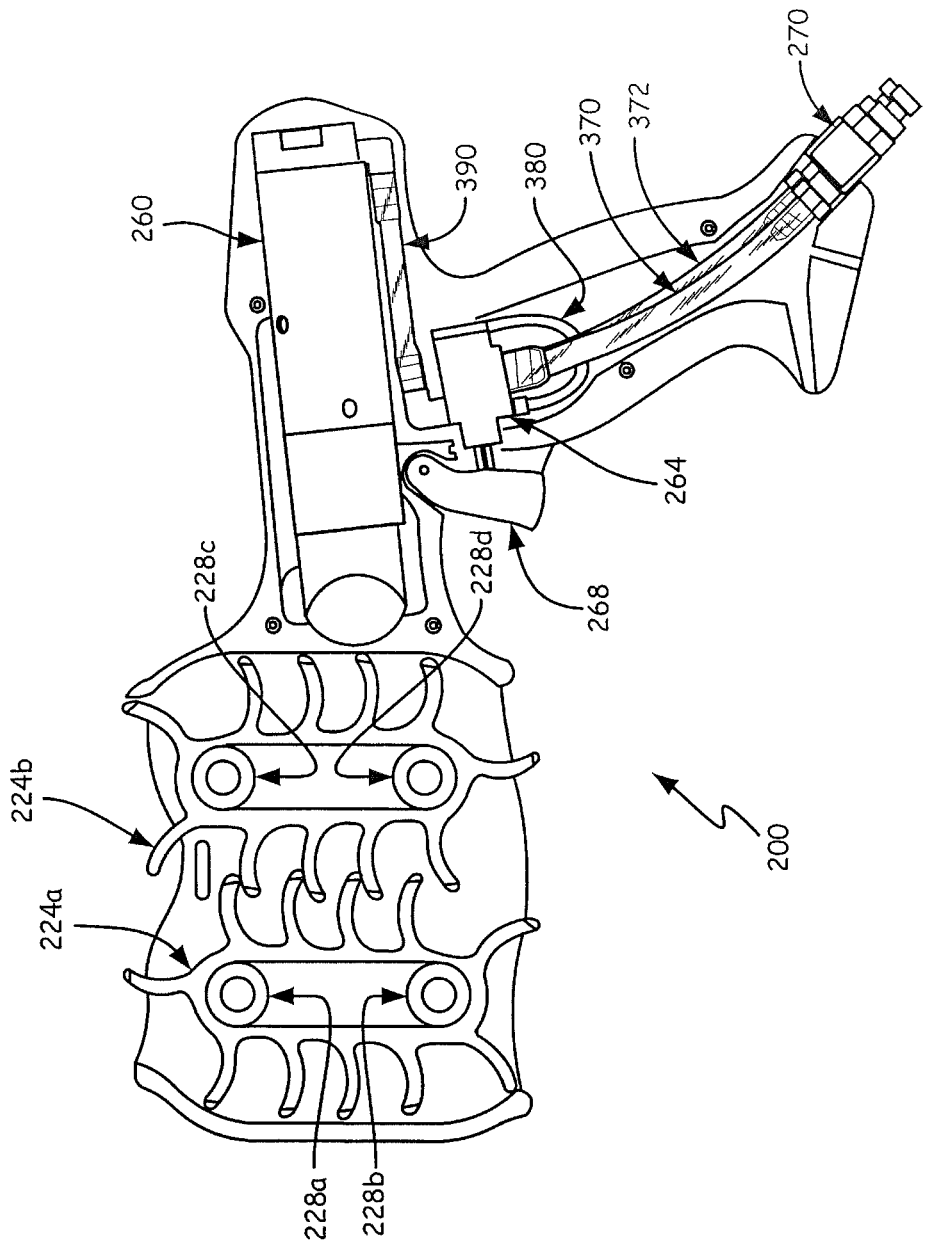
FIG. 6 is a schematic of a side view of a udder gun assembly.
Figure 7:
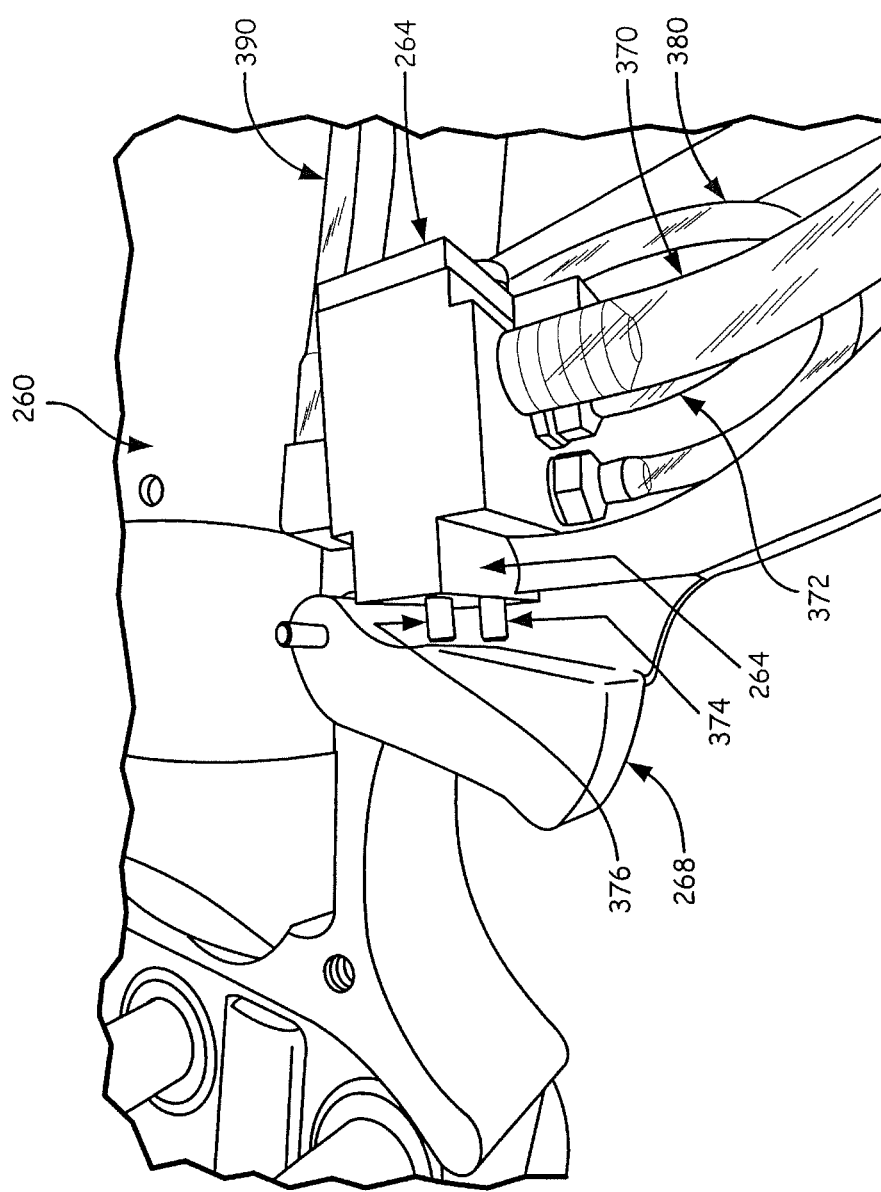
FIG. 7 is a sectional view of the valve region of a udder gun.
Figure 8A:
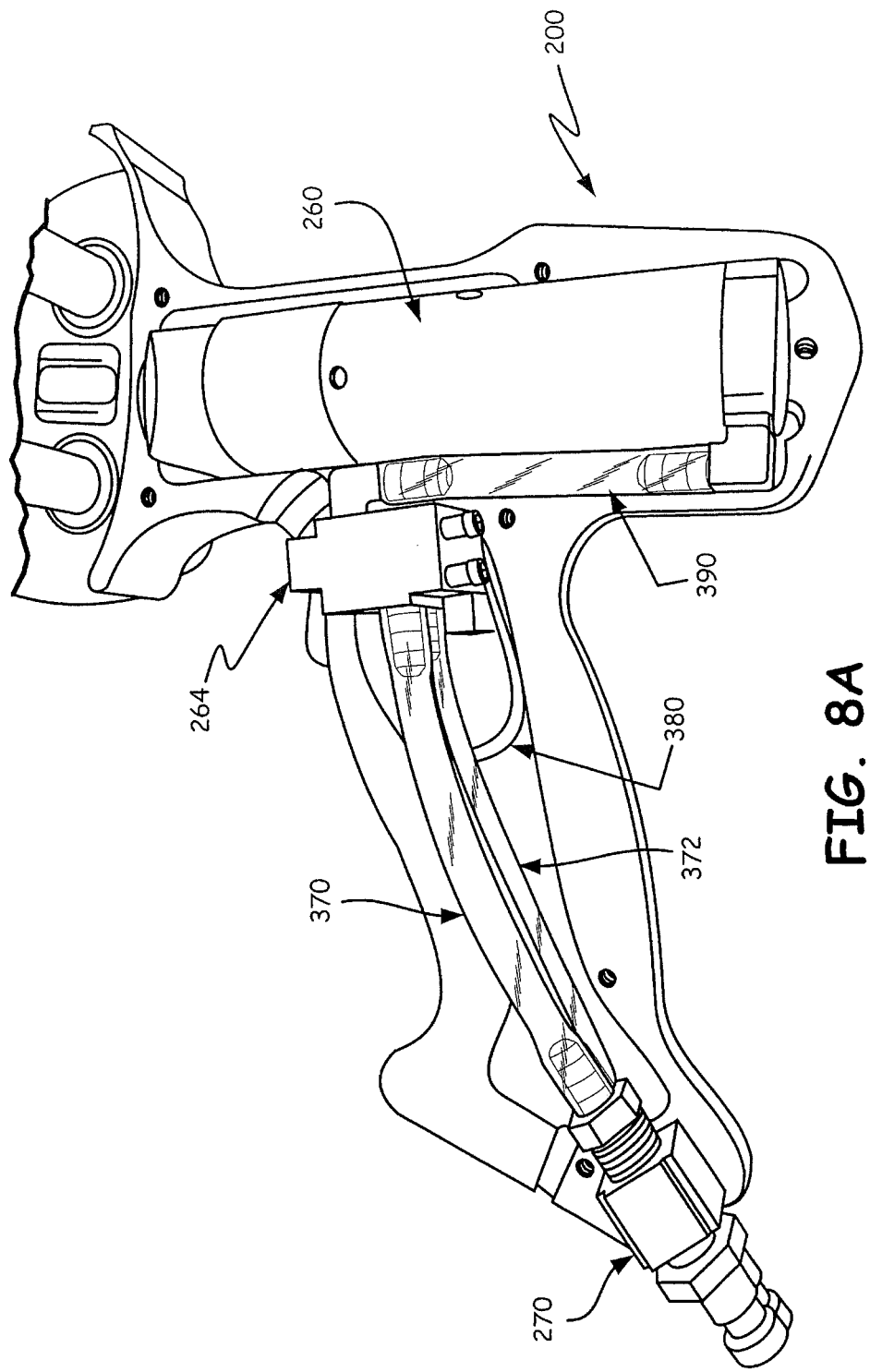
FIG. 8A is a sectional view of the air and water inlet region of an udder gun.

FIG. 6 is a side view of washer 200. Teat belts 224a and 224b are mounted on spindles 228a-b and 228c-d, respectively as described above. FIG. 7 is a sectional view of the valve region. FIG. 8A is a sectional view of the air and water inlet region and FIG. 8B is a perspective view of airmotor 390 and valve 264. Water and air inlet manifold block 270 includes two openings at the bottom exterior end configured for attachment to tubing or lines. A liquid line is attached to first opening of block 270 and a compressed air line is attached to second opening of block 270. Generally, the air line has a larger diameter tube and the water line has a smaller diameter tube. Water and air inlet manifold block 270 also includes two openings on the interior end also configured for attachment to tubing or lines. Line 372 transports liquid, for example, treated water to valve block 264 and line 370 transports air to valve block 264. Valve block 264 also includes actuator pins 374 and 376 projecting from the front end of valve 264 that can engage trigger 268. Upon actuation of trigger 268, actuator pins 374 and 376 are engaged and release water and air from valve block 264 simultaneously. The front of valve block 264 is preferably angled downward for maintaining a clean valve. Liquid and air are released from valve block 264. Valve block 264 includes a separate water valve and air valve within the same block. Water inlet 372 and outlet 380 are the small lines on the bottom of valve block 264. Water outlet line 380 loops back upward and alongside the airmotor through passage ways to the nozzle on the housing backside. Air inlet 370 enters the bottom of the valve block and the exits through air outlet line 390 on the top that connects to air motor 260. Air inlet and outlet lines generally larger than the water inlet and outlet lines.

Airmotor 260 is located in groove 324 of frame 212 and includes a right angle output drive configuration and planetary gear. A variety of airmotors may be used but airmotors are preferably small and light and are lubrication free airmotors. Small airmotors are desirable, preferably less than one pound. In one exemplary embodiment, a small 1.06" diameter×4" long airmotor weighing less than 1 lb model LZB14L-A029-11 purchased from Atlas Copco, Rock Hill, S.C. The output of airmotor 260 is projected through opening 328. Upon actuation of trigger 268, compressed air exits valve 264 and into line 390 along the exterior of airmotor 260 and enters bottom end of airmotor 260. Output from airmotor 260 powers drive belts 230 attached to pulley system 234a-e to activate. Exhaust from airmotor 260 is ported to drive belt side to blow water from round belts and pulleys along with muffling noise. When trigger 268 actuates pins 374 and 376, a small amount of pressurized air and water are intentionally leaked past their respective pins around their diameter, cleaning out debris from the outer exposed portion of pins 374 and 376, thereby keeping them from sticking.

Figure 9A:
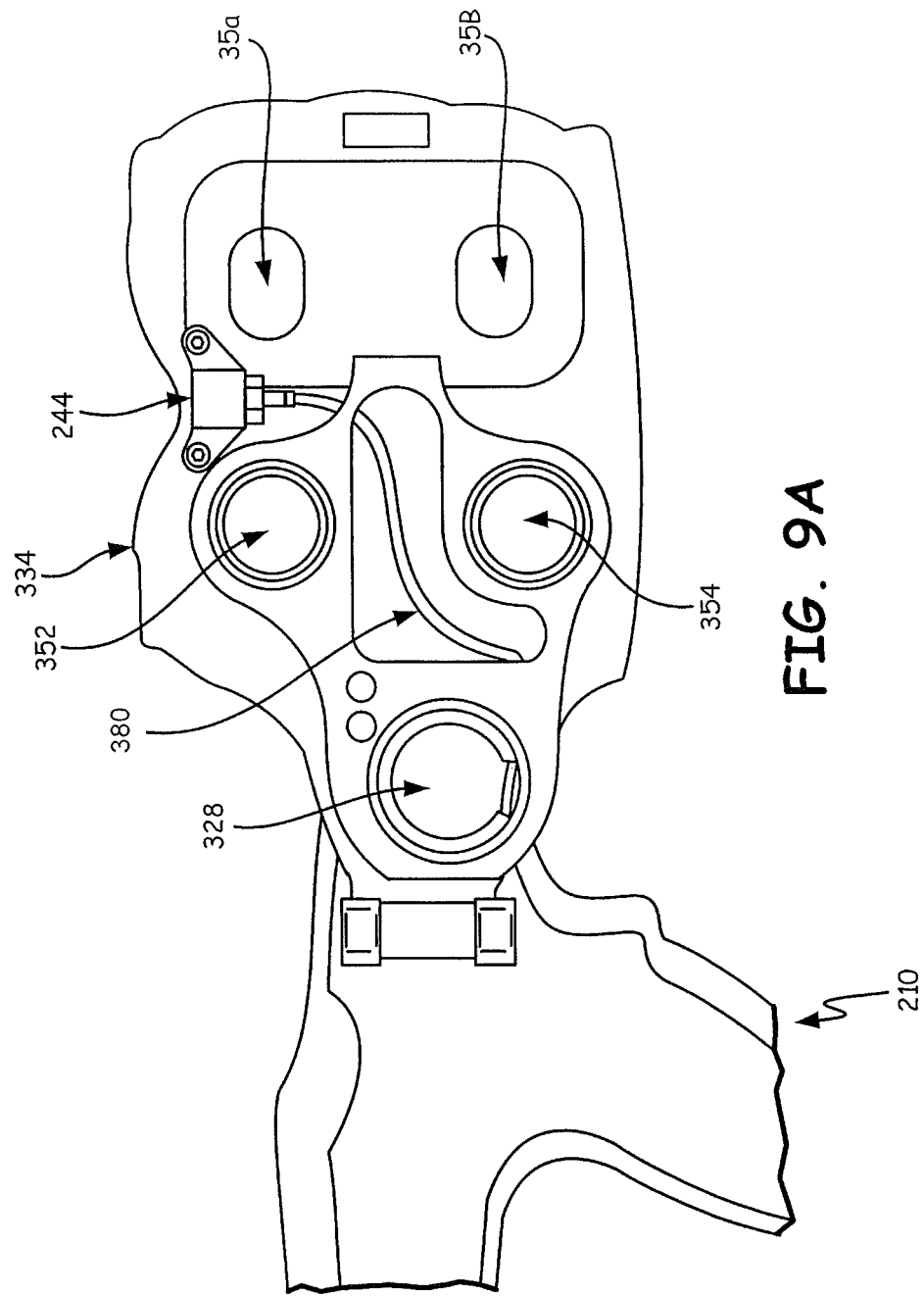
FIG. 9A is a side view of the drivebelt side of main housing of an udder gun.
Figure 9B:
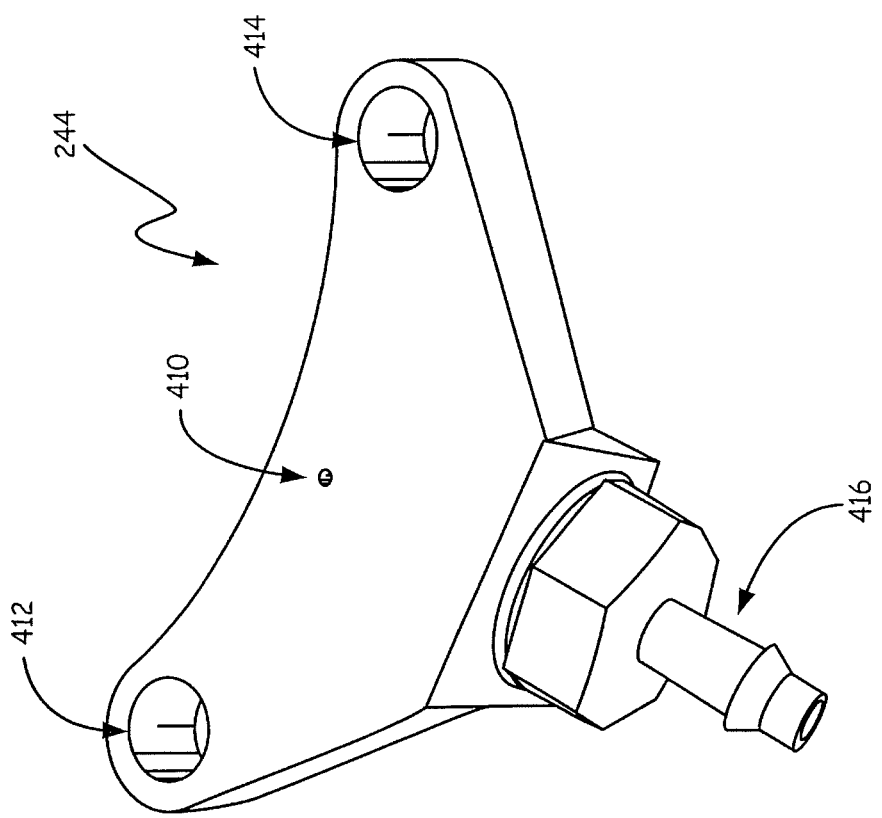
FIG. 9B is a perspective view of a nozzle used in an udder gun.
Figure 10:
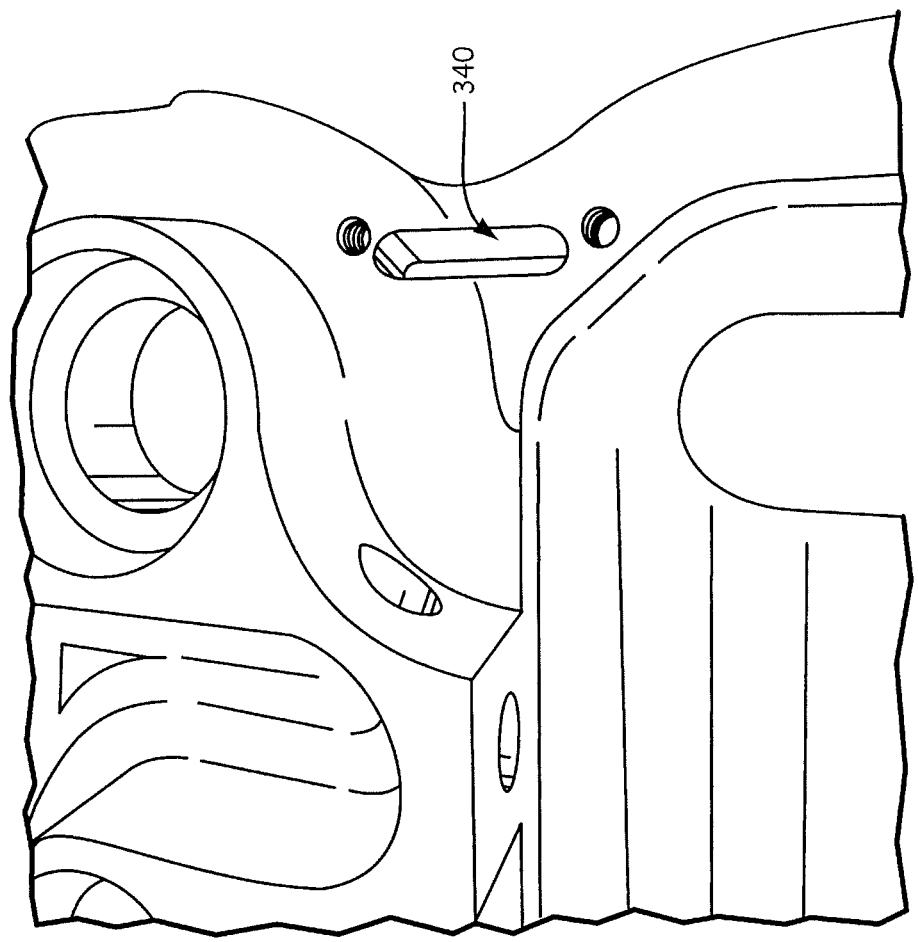
FIG. 10 is a sectional view of slit area.

FIG. 9A is a side view of the drivebelt side of frame 210. Nozzle 244 is mounted onto mounting plate 334 over water slit 340. Preferably, nozzle 244 is fastened to mounting plate 334 through the use of two screws. Other methods of fastening nozzle 244 to mounting plate 334 may also be used. Line 380 leaves valve 264 carrying liquid and is routed along grooves and openings in mounting plate 334 and frame 210 as shown in FIG. 9A and connected to the bottom end of nozzle 244. The precise path of water line 372 is not important but frame 210 and mounting plate 334 is configured to provide a pathway for liquid line 380 to reach from valve 264 to nozzle 244 without interfering with drive belts 230 and pulley system 234a-e. Water nozzle 244 includes a flat side and a raised side. The raised side is extended out and away from mounting plate 334 and the flat side is in contact with and faces mounting plate 334. As shown in FIG. 9B, nozzle 244 also includes aperture 410 on the flat side of nozzle 244. Liquid enters nozzle 244 from line 372 attached to inlet 416 and is sprayed through aperture 410 out onto teat belts 224a-b and into opening 206 of washer 200. Openings 412 and 414 can receive screws or other fasteners to attach nozzle 244 to mounting plate 334.

Positioning of water nozzle 244 towards top of washer 200, thus toward the top of the animal teat, enables a significant amount of liquid to be released during the cleaning phase. In preferred embodiments, liquid is sprayed near the top of the teat at a rate of between about 4 and about 16 ounces of water per minute while the belts are running. Liquid spraying rates outside of this range are also within the scope of this invention.

FIG. 9A also includes openings 352, 354, 356 and 358. Pulleys 234a-d are mounted on the drive belt side and are rotatably engaged with knurled spindles 228a-d mounted on the teat belt side of mounting plate 334 through the use of bearings. Bearings are preferably solid, lubricated stainless steel bearings, especially when teat washers are to be used in sand bedding environments. These stainless steel bearings are more durable in the sandy environments. The pulleys and spindles may also be made from a variety of materials such as stainless steel, hard-anodized aluminum, titanium and the like. In some exemplary embodiments hard-anodized aluminum is used for better wear resistance and weight reduction. The elongated openings 356 and 358 allow outer spindles 228a and 228b to rotate or slide away from inner spindles 228c and 228d and is described in greater detail below and illustrated FIGS. 12A-C and FIGS. 13A-C.

Figure 11:
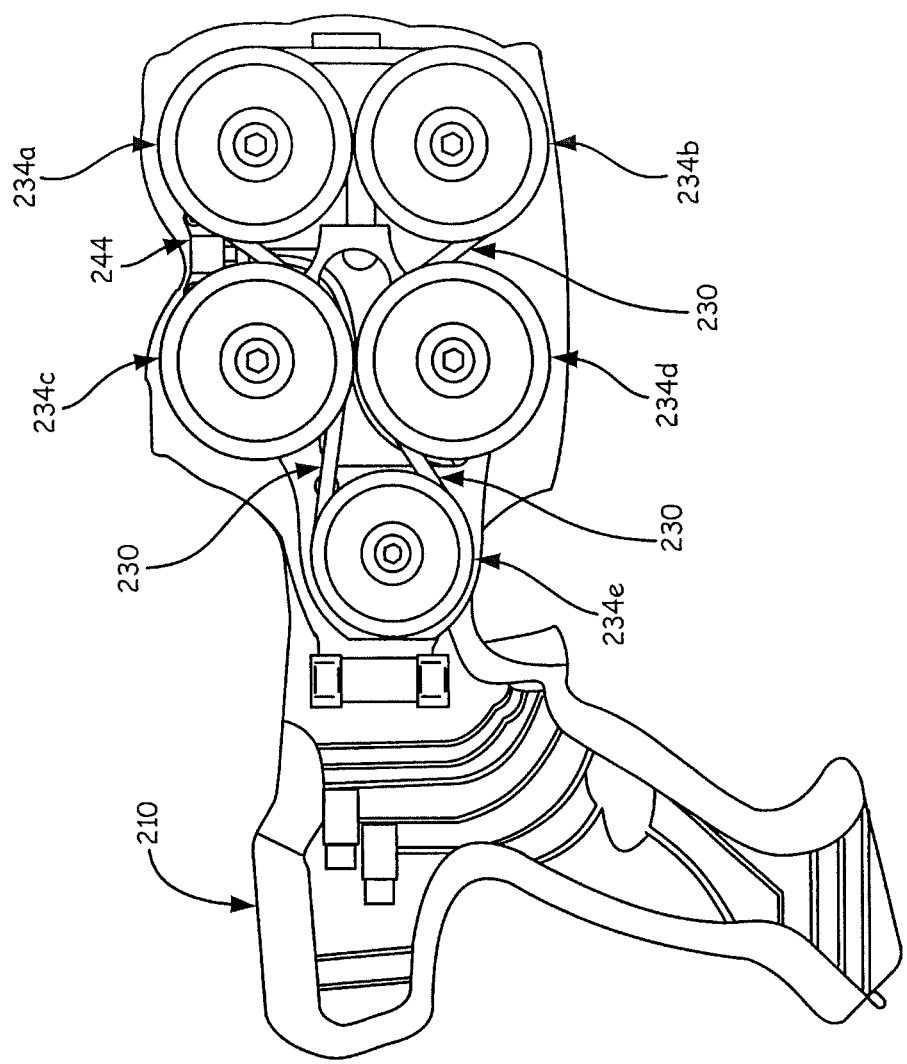
FIG. 11 is a sideview of the drivebelt side of main housing in an udder gun.

FIG. 11 is a sideview of the drivebelt side of frame 212 with the pulley assembly and drivebelts mounted. Pulley 234e is the drive pulley and is mounted over head 258 (shown in FIG. 8B) of airmotor 260, wherein head 258 extends at a right angle from airmotor 260 through opening 328 as shown in FIGS. 3, 8A and 8B. Drivebelts 230 are threaded between pulleys 234a-e as shown in FIG. 11 and drive the pulleys to move in the proper direction. Drivebelts 230 are preferably twin urethane round belts but other drivebelt or drivebelts that can accomplish the same purpose are within the scope of the invention. Pulleys 234a-d are rotatably engaged with and drive knurled spindles 228a-d mounted on the teat belt side of mounting plate 334. Bearings 250 or other components may be used to engage pulleys 234a-d with knurled spindles 228a-d.

Figure 12B:
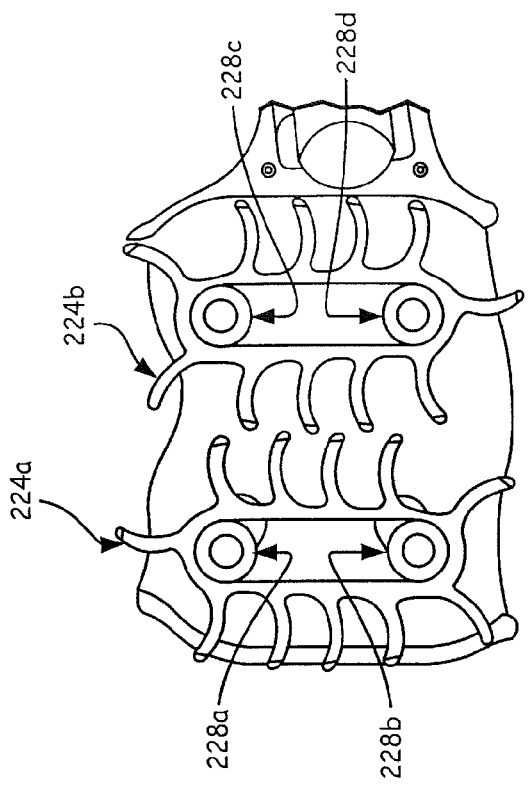
FIGS. 12A, 12B, and 12C are schematic views of the teat belts in the normal, expanded and tilted configurations, respectively.
Figure 12A:
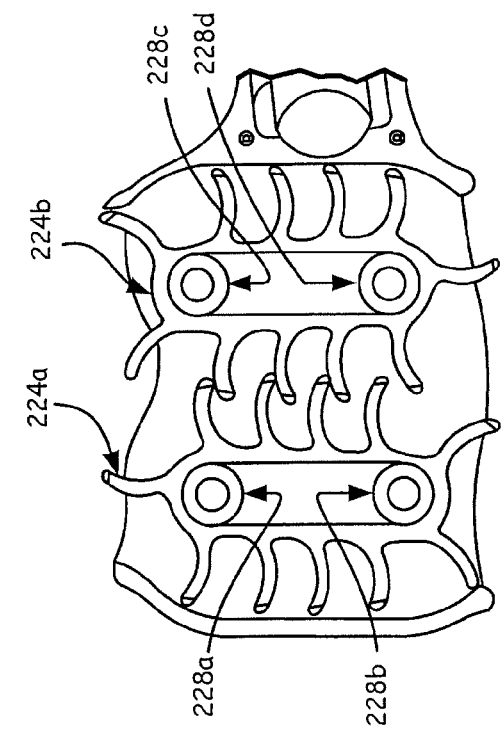
Figure 12C:
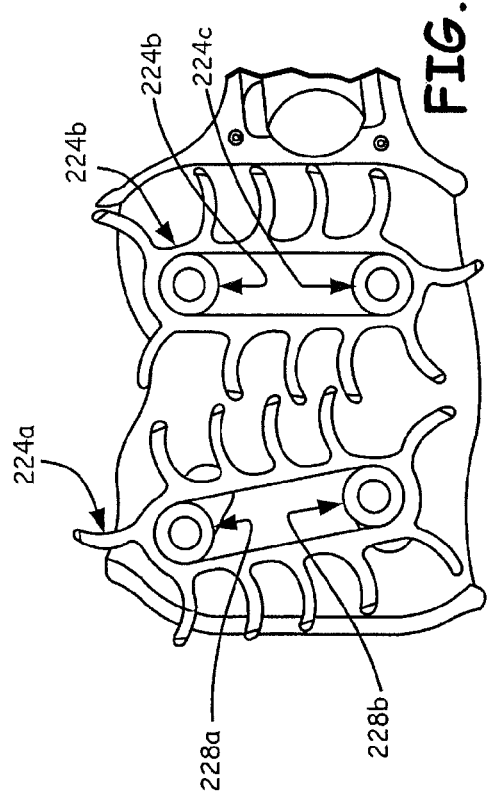

In preferred embodiments of washer 200, outer spindles 228a and 228b with teat belt 224a can translate and rotate away from inner spindles 228c and 228d with teat belt 224b as shown in FIGS. 12A-C and FIGS. 13A-C. The ability for outer spindles to rotate away from inner spindles enables accommodation of varying sizes and lengths of animal teats. Outer spindle pair (228a-228b) can translate and rotate away from inner pair of spindles using the tension from the urethane round drive belts as a spring element to adjust for varying size teats automatically. FIG. 12A illustrates an embodiment wherein teat belts 224a and 224b are close together and overlapping. In FIG. 12B, outer spindles 228a and 228b have slid over to accommodate a larger size as illustrated by less overlapping between belts 224a and 224b. FIG. 12C illustrates an embodiment with outer spindles 228a rotating away from inner spindles 228c to accommodate an elongated teat.

Figure 13B:
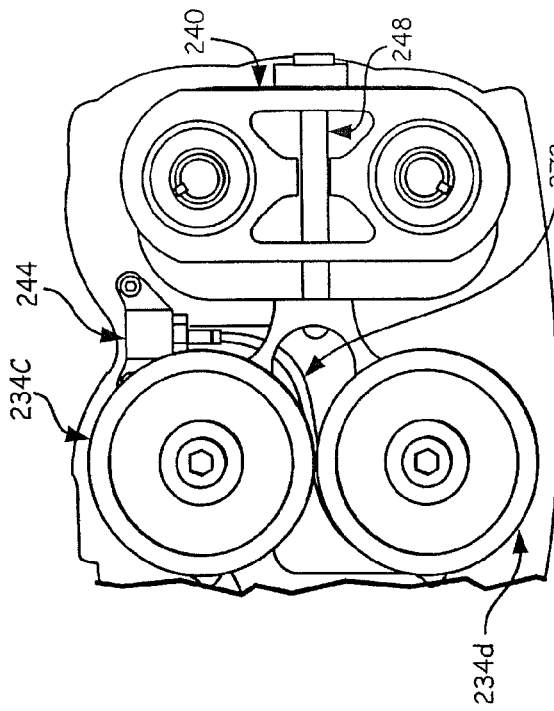
FIGS. 13A, 13B, and 13C are schematic views of the moving block in the normal, expanded and tilted configurations, respectively.
Figure 13C:
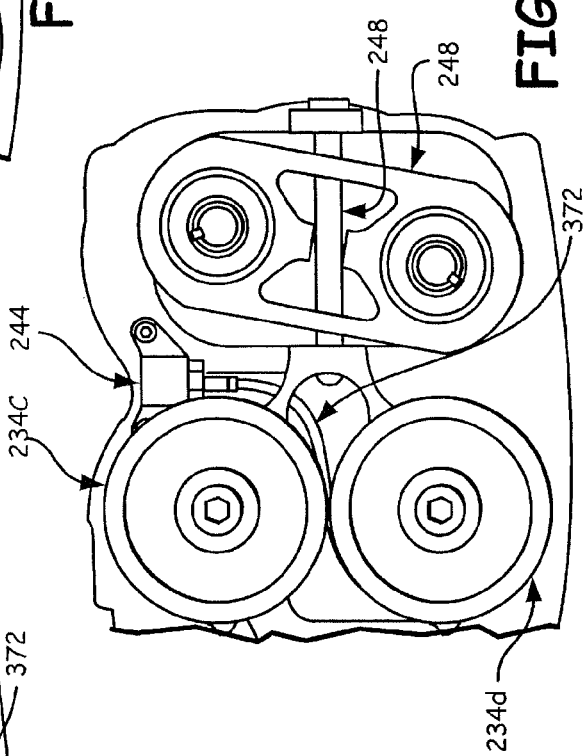
Figure 13A:
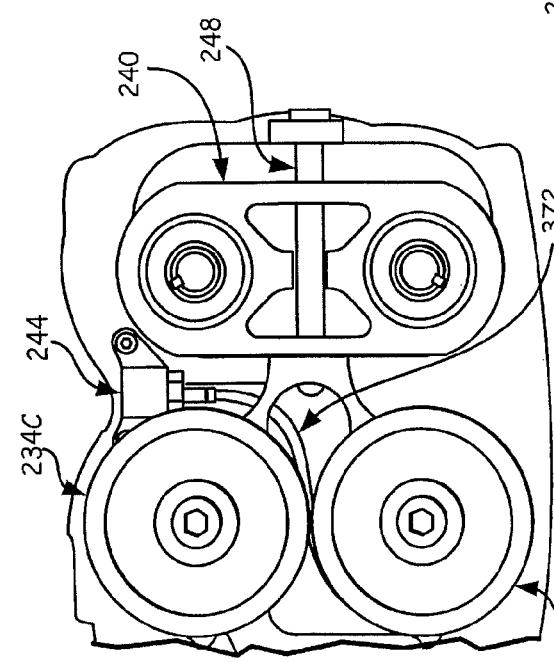

FIG. 13A-C illustrate movable block 240 mounted on the drivebelt side of mounting plate 334. Pulleys 234a and 234b, as shown in FIG. 11, are mounted on movable block 240. Movable block 240 is one piece and rides on stationary removable pin 248 that limits the movement to two degrees of freedom. The openings 356 and 358 in mounting plate 334, as shown in FIG. 9A, over which movable block 240 is place are elongated enabling the block to slide along the openings. Removal of pin 248 enables movable block 240 to be removed for cleaning. FIG. 13A illustrates an embodiment wherein movable block 240 is close to stationary pulleys 234c and 234d. In FIG. 13B, movable block 240 has slid over to accommodate a larger size udder as illustrated by the movement of block 240 closer to the head of pin 248. FIG. 13C illustrates an embodiment with top of movable block 240 rotating away from pulley 234c to accommodate an elongated teat.

In an alternative embodiment, pulleys 234c and 234d, spindles 228c and 228d may also be configured on a movable block similar to movable block 240 using a stationary pin. This can allow ease of access for cleaning or replacing parts on the udder gun.

Methods for cleaning, sanitizing, drying and stimulating a teat of a milk-producing animal are also within the scope of this disclosure. The method includes inserting a teat or udder for preparation of milking into opening 206 of washer 200. When the teat is inserted, movable block 240 can slide or rotate as needed to accommodate the size and length of the inserted teat. Advantageously, this is performed automatically by washers described herein without any intervention from the user. Trigger 268 can be actuated when ready to release liquid onto the top of the teat and compressed air into airmotor 260. Airmotor 260 powers drivebelts 230 and causes knurled spindles 228a-d to rotate appropriately thus activating teat belts 224a and 224b. Movement of teat belts 224a and 224b cleans and stimulates the teat in opening 206 while liquid is sprayed from nozzle 244. Air drives airmotor 260 and exhausted air cleans and dries urethane drive belts 230. The washer is actuated by the trigger for a desired length of time or until the user has determined that the udder is sufficiently sanitized and ready for milking. The length of time to treat each teat can be between about 1 second and about 3 seconds. Cleaning times greater than this are also within the scope of this invention. The desired length of time for treating an udder can vary and is preferably at least 3 seconds. In an exemplary embodiment, the cleaning/stimulating time for an udder (4 teats) can range between about 5 seconds to about 12 seconds. Cleaning times of less than 5 seconds and more than 12 seconds are also within the scope of this invention. The amount of liquid dispensed and rate of spraying of the liquid can vary and are disclosed above.

Although the present invention has been described with reference to preferred embodiments, workers skilled in the art will recognize that changes may be made in form and detail without departing from the spirit and scope of the invention.

What is claimed is:

1. A system for cleaning teats of milk-producing animals comprising a handheld washer, the washer comprising:
    an airmotor with a planetary gear reduction and a right angle output drive configuration;
    a frame comprising a mounting plate configured for an outer pair of knurled spindles holding a first teat belt and an inner pair of knurled spindles holding a second teat belt, drive belts attached to the planetary gear reduction system to drive all the spindles, wherein the teat belts and the drive belts are on opposite sides of the mounting plate;
    a movable block slidable on a stationary pin to translate or rotate the outer pair of spindles away from the inner spindles;
    an opening at the top end for receiving a teat for sanitizing/stimulation;
    a handle with a trigger engaged with the actuator pin end of a valve for releasing liquid and air onto the teat when the trigger is actuated; and
    housing configured to house the washer components in a functional manner.

2. The system of claim 1 wherein the teat belts comprise flaps.

3. The system of claim 1 wherein the housing comprises a teat belts cover and a drive belts cover, wherein the covers comprise a hinged attachment to the housing and a latch to hold the covers in place during operation.

4. The system of claim 3 wherein the latch, when unlatched, provides access to the belts for cleaning and replacement.

5. The system of claim 1 wherein the handle comprises an ergonomic grip.

6. The system of claim 1, wherein the stationary pin is removable and removal of the pin from the washer releases the movable block.

7. The system of claim 1 wherein the drive belts are attached to planetary gear reduction system is a pulley system.

8. The system of claim 1 wherein the airmotor is lubrication free.

9. The system of claim 1 wherein the exhaust from the airmotor is ported to the drive belts side.

10. The system of claim 1 wherein the valve intentionally leaks a small amount of air out the actuator pin end.

11. The system of claim 1 wherein the washer further comprises a nozzle positioned to direct the liquid toward the top of a teat when engaged.

12. The system of claim 1 wherein the device is air and/or water driven.

13. The system of claim 1 wherein the washer is attached to a compressed air line and a liquid line.

14. The system of claim 13 wherein the liquid in the liquid line comprises water, sanitizing chemicals, sanitizing wash and combinations thereof.

15. The system of claim 14 wherein the liquid flow rate in the liquid line is about 0.1 gallons per minute or less.

16. The system of claim 1 wherein the inner spindles are mounted on a movable block.

17. A method for preparing teats of milk-producing animals for milking comprising:
    inserting a teat into an opening in the top-end of a handheld washer; and
    actuating a trigger on the washer wherein actuation of the trigger releases liquid and air and drives teat belts in the washer to clean and stimulate the teat.

18. The method of claim 17 wherein the handheld washer comprises:
    an airmotor with a planetary gear reduction and a right angle output drive configuration;
    a frame comprising a mounting plate configured for an outer pair of knurled spindles holding a first teat belt and an inner pair of knurled spindles holding a second teat belt, drive belts attached to the planetary gear reduction system to drive all the spindles, wherein the teat belts and the drive belts are on opposite sides of the mounting plate;
    a movable block slidable on a stationary pin to translate or rotate the outer pair of spindles away from the inner spindles;
    an opening at the top end for receiving a teat for sanitizing/stimulation;
    a handle with a trigger engaged with the actuator pin end of a valve for releasing liquid and air onto the teat when the trigger is actuated; and
    housing configured to house the washer components in a functional manner.

19. The method of claim 17 wherein the liquid is water, sanitizer or a combination thereof.

20. The method of claim 17 wherein the liquid is released at a rate of between about 4 and about 16 ounces per minute.

21. The method of claim 17 wherein the liquid and air are released simultaneously while the teat belts are running.

22. The method of claim 17 wherein the liquid is directed toward the top of the teat through a water nozzle in the washer.

23. The method of claim 17 wherein the movable block in the washer slides away when engaging a larger udder and is tensioned inward by the drive belts.

24. The method of claim 17 wherein the top portion of the movable block rotates or tilts away when engaging an elongated udder.

* * * * *